ic Office 3,236,678
Patented Feb. 22, 1966

3,236,678
SUBBING LAYER FOR POLYCARBONATE FILMBASE
James R. Waring, Binghamton, N.Y., assignor to General Aniline & Film Corporation, New York, N.Y., a corporation of Delaware
No Drawing. Filed Aug. 29, 1960, Ser. No. 52,333
4 Claims. (Cl. 117—76)

The present invention relates to the subbing of polycarbonate filmbase so as to provide an excellent bond on any hydrophilic overcoating on the base such as an N.C. layer or a light-sensitive photographic silver halide emulsion.

In copending application Serial No. 33,925, filed June 6, 1960, by Russell P. Easton and me, we disclosed and claimed the subbing of filmbase from polycarbonate resins through the utilization of a subbing solution containing as its essential components a lower alkylene carbonate such as propylene carbonate, ethylene carbonate or the like, gelatin and a mixture of film-forming resins such as nitrocellulose on the one hand and a copolymer of a lower alkyl acrylate and a lower alkyl methacrylate on the other hand.

It was noted that part of the lower alkylene carbonate could be replaced by less expensive solvents such as methanol, ethanol, diacetone alcohol, acetone or butyl Cellosolve. Typically, it was observed that the quantity of the alkylene carbonate could be reduced to 40 cc. per 100 cc. of the subbing solution when the solvent diluent amounted to about 43%.

Very good results are obtained by use of the subbing solution contemplated in said application for filmbase made from polycarbonate resins as per the patents referred to on page 1 of the application. However, the subbing solution leaves something to be desired as regards crazing of the polycarbonate base on the one hand and the cost of the subbing solution on the other hand.

I have now discovered that a subbing solution comprising an aqueous-organic solvent composition containing as its essential components a lower alkylene carbonate, acetic acid, a water soluble colloid particularly gelatin and a mixture of cellulose nitrate with a modified polycarbonate resin having hydrophilic properties or a polyacrylate, or a mixture of a hydrophilic modified polycarbonate copolymer resin with a polyacrylate or polymethacrylate resin gives results superior to those obtained according to said application.

Such a solution and a single subbing layer capable of producing a very tight bond between the polycarbonate filmbase and a hydrophilic colloidal overcoating constitute the purposes and objects of my invention.

The lower alkylene carbonate is an essential component of my subbing solution. However, the quantities may be considerably reduced when using acetic acid, methyl acetate or ethyl acetate and ethanol as a diluent for the alkylene carbonate. Typically, I may use a quantity of the carbonate amounting to about 20 cc. per 100 cc. of the coating solution when employing about 20 cc. of acetic acid and 42 cc. of ethanol as the carbonate diluent. The acetic acid not only serves to reduce the necessary quantity of the alkylene carbonate but also reduces the tendency of the polycarbonate base to crack or craze.

Gelatin in an amount of from .6 to .9 gram per 100 cc. of solution is another essential component. The gelatin contributes the important function of imparting a degree of water receptivity to an otherwise hydrophobic coating. This aids in bonding the filmbase to the hydrophilic colloidal overcoating on the subbing layer.

The other essential component of the subbing solution is film-forming material comprising either a mixture of cellulose nitrate and a modified polycarbonate copolymer which is soluble in acetone on the one hand or in a mixture of methylene and ethylene chloride on the other hand, or a mixture of such polycarbonate copolymer on the one hand and a polyacrylate or polymethacrylate or copolymers thereof on the other hand. The acrylate polymer in this case is soluble in toluene.

To improve the bonding of the substrate to the overcoat thereon, it is recommended that a small amount of a hardening agent such as glyoxal dissolved in an aqueous organic solvent such as a mixture of water and methanol be employed. The hardening agent serves to cross-link the gelatin in the substrate with the gelatin in the overcoat on the substrate. The quantity of glyoxal may range from .005 to .01 gram per 100 cc. of solution.

The solvent system containing the gelatin, alkylene carbonate, acetic acid and film-forming resin is primarily organic and, hence, it is desirable to use a dispersing agent to disperse the gelatin in the subbing solution. To this end, I may use an organic acid such as phthalic acid, salicylic acid or the like. The quantity of the acid used for dispersing the gelatin generally amounts to about .5 to .2 gram per 100 cc. of the subbing solution.

Various organic solvents may be used in the subbing solution such as those previously mentioned, i.e., methanol, ethanol, diacetone alcohol, acetone or butyl Cellosolve. The quantity of solvent employed is indicated in the examples and will be such as will be sufficient to hold the various components in solution for coating.

It might be noted that the ratio of the film-forming resin to the gelatin employed is not critical. Generally, however, I use an acetone-soluble polycarbonate copolymer in an amount of .3 to .5 gram per 100 cc. of the coating solution. The same is true of the cellulose nitrate. The acrylate or methacrylate resin may be as low as from .3 to .5 gram per 100 cc. of the solution. These ranges, however, may be modified according to the skill of the operator to provide a solution which may be coated on the polycarbonate filmbase and which when dried out yields a very tenacious bond between the filmbase and any hydrophilic overcoating thereon.

In preparing the subbing solution, I have found it advisable to make up the solution in three parts: Part 1 contains the gelatin; Part 2 the lower alkylene carbonate, acetic acid or its equivalent; and Part 3 the film-forming resin. Part 1 is warmed and added to Part 2 with stirring. Part 3 is then added to the resulting solution. However, while this is the preferred method of operating, it is not essential to admix the solutions in the order given.

The solution obtained by mixing the various ingredients is coated in a conventional manner on the polycarbonate filmbase and the coating dried. Hydrophilic colloids such as photographic silver halide emulsions or gel overcoatings may then be laid down on the substrate and dried. It will be found that such overcoats will be tenaciously bonded to the substrate and the substrate in turn firmly bonded to the polycarbonate filmbase.

The following examples are illustrative of my invention but it is to be understood that the invention is not restricted thereto.

*Example I*

*Part 1.*—.75 gram of gelatin is swelled in 2.04 cc. of water. To this solution there are added 2.46 cc. of a 10% solution of phthalic acid in methanol and 4.94 cc. of methanol.

*Part 2.*—To 20.7 cc. of acetic acid there are added 20.4 cc. of propylene carbonate, 0.13 cc. of a 4% solution of glyoxal in aqueous methanol and 41.1 cc. of ethanol.

*Part 3.*—To 3.76 cc. of a 10% solution of modified polycarbonate copolymer in acetone are added 3.76 cc. of a 10% solution of 15–20 sec. cellulose nitrate in acetone.

Part 1 is warmed and added to Part 2 while stirring. Part 3 is then added to the solution of Parts 1 and 2. The resulting homogeneous solution is coated on polycarbonate film-base and the coating dried. When the substrate prepared as above is overcoated with a gelatino silver bromide emulsion and dried, it is found that all layers are very firmly bonded together.

Example II

*Part 1.*—.75 gram of gelatin is swelled in 2.04 cc. of water and to this solution there are added 2.46 cc. of a 10% solution of phthalic acid in methanol and 4.94 cc. of methanol.

*Part 2.*—To 20.7 cc. of methyl acetate are added 20.4 cc. of propylene carbonate, 41.1 cc. of ethanol and .13 cc. of 4% glyoxal in an aqueous solution of methanol.

*Part 3.*—To 3.76 cc. of a 10% solution of polycarbonate copolymer in acetone are added 3.76 cc. of 10% solution of 15–20 sec. cellulose nitrate in acetone.

The three solutions are combined and coated on polycarbonate filmbase. After drying, the substrate is coated with a gelatin layer and it is found that after drying, all layers are firmly bonded together.

Example III

*Part 1.*—.77 gram of gelatin is swelled in 2.1 cc. of water and to this solution are added 2.54 cc. of a 10% solution of phthalic acid in methanol and 5.07 cc. of methanol.

*Part 2.*—21.3 cc. of acetic acid are added to 20.95 cc. of propylene carbonate, 42.3 cc. of ethanol and .13 cc. of a 4% glyoxal solution in aqueous methanol.

*Part 3.*—3.86 cc. of a 10% polycarbonate copolymer solution in acetone are combined with .96 cc. of a 40% solution of polymethylmethacrylate in toluene.

The three solutions are combined and coated on polycarbonate filmbase. After drying, it is found that the adhesion of the substrate to the base is very satisfactory.

Example IV

*Part 1.*—.77 gram of gelatin is swelled in 2.1 cc. of water and to this solution are added 2.54 cc. of 10% phthalic acid in methanol and 5.07 cc. of methanol.

*Part 2.*—21.3 cc. of methyl acetate and 20.95 cc. of propylene carbonate are added to a solution of .13 cc. of a 4% glyoxal solution in methanol and 42.3 cc. of ethanol.

*Part 3.*—3.86 cc. of a 10% solution of polycarbonate copolymer in acetone are added to .96 cc. of 40% solution of polymethylmethacrylate in toluene.

The three solutions are combined and coated on polycarbonate filmbase. Satisfactory adhesion of the dried substrate is obtained.

Example V

*Part 1.*—.76 gram of gelatin is swelled in 2.07 cc. of water and to this solution are added 2.51 cc. of 10% phthalic acid in methanol and 5.01 cc. of methanol.

*Part 2.*—21.22 cc. of acetic acid and 20.7 cc. of propylene carbonate are added to .13 cc. of a 4% solution of glyoxal in aqueous methanol and 41.8 cc. of ethanol.

*Part 3.*—3.82 cc. of a 10% solution of 15–20 sec. cellulose nitrate in acetone are added to 2.12 cc. of an 18% solution of polycarbonate copolymer in a mixture of ethylene chloride and methylene chloride.

The solutions are combined, coated on polycarbonate filmbase and dried. Excellent results are obtained.

The preparation of polycarbonate polymers and copolymers is described in "Angewandte Chemie," vol. 68, No. 20, October 21, 1956, page 635. There, four principal methods are described including the reaction of dioxy compounds with phosgene in the presence of acid-binding agents.

The polycarbonate copolymer used herein and in the preceding examples is a copolymer of Carbowax 4000 and bis-phenol A joined together by carbonate linkages derived from phosgene. A typical product can be prepared by reacting 400 grams of Carbowax 4000 with phosgene and 100 grams of bis-phenol A.

Carbowax 4000 is a solid polyethylene glycol, sp. gr. 1.2, freezing range 50–55° C., viscosity Saybolt sec. at 210° F. 500–700.

Bis-phenol A is 4,4′-isopropylidenediphenol.

Modifications of the invention will occur to persons skilled in the art. Thus, in lieu of polymethylmethacrylate, other polyacrylates may be used, such as polyacrylic acid, polyethylacrylate and copolymers of acrylic acid and methacrylic acid, copolymers of methylacrylate and methylmethacrylate and the like. Similarly, cellulose nitrates having different viscosities than those of the examples may be employed. I, therefore, do not intend to be limited in the patent granted except as necessitated by the appended claims.

I claim:

1. A subbing solution for bonding a hydrophilic colloid to a polycarbonate filmbase comprising an aqueous-organic solvent solution containing as its essential components gelatin, a lower alkylene carbonate, a solvent selected from the class consisting of acetic acid, methyl acetate and ethyl acetate and a mixture of a hydrophobic polycarbonate copolymer with a substance selected from the class consisting of cellulose nitrate and a polyacrylate selected from the group consisting of polymethyl methacrylate, polyethyl acrylate and copolymers of methyl acrylate and methyl methacrylate, said copolymer consisting of the radicals of a polyethylene glycol having a specific gravity of 1.2, a freezing range of 50–55° C. and a viscosity in Saybolt seconds at 210° F. of 500 to 700, and of 4,4′-isopropylidenediphenol interconnected by carbonate linkages.

2. A subbing solution as defined in claim 1 which contains an organic acid selected from the class consisting of phthalic and salicylic acids as a dispersing agent for gelatin.

3. A subbing solution as defined in claim 1 containing glyoxal as a cross-linking agent for gelatin.

4. A photographic element comprising a polycarbonate base and a hydrophilic colloid, said base being bonded to the hydrophilic colloid by a subbing layer containing as its essential components gelatin, a lower alkylene carbonate and a mixture of a hydrophobic polycarbonate copolymer and a substance selected from the class consisting of cellulose nitrate and a polyacrylate selected from the group consisting of polymethyl methacrylate, polyethyl acrylate and copolymers of methyl acrylate and methyl methacrylate, said copolymer being soluble in a solvent selected from the class consisting of acetic acid, methyl acetate and ethyl acetate and consisting of the radicals of a polyethylene glycol having a specific gravity of 1.2, a freezing range of 50–55° C. and a viscosity in Saybolt seconds at 210° F. of 500 to 700 and of 4,4′-isopropylidene diphenol interconnected by carbonate linkages.

References Cited by the Examiner

UNITED STATES PATENTS 3,005,787  10/1961  Waring et al. _____ 260—8
3,025,163  3/1962  Ossenbrunner et al. __ 260—47 X WILLIAM H. SHORT, *Primary Examiner.*

ALLEN D. SULLIVAN, JAMES A. SEIDLECK,
*Examiners.*